Sept. 28, 1954     E. M. GODFREY, JR     2,690,207
TIRE TREAD CEMENTING MACHINE
Filed Dec. 3, 1951     3 Sheets-Sheet 3
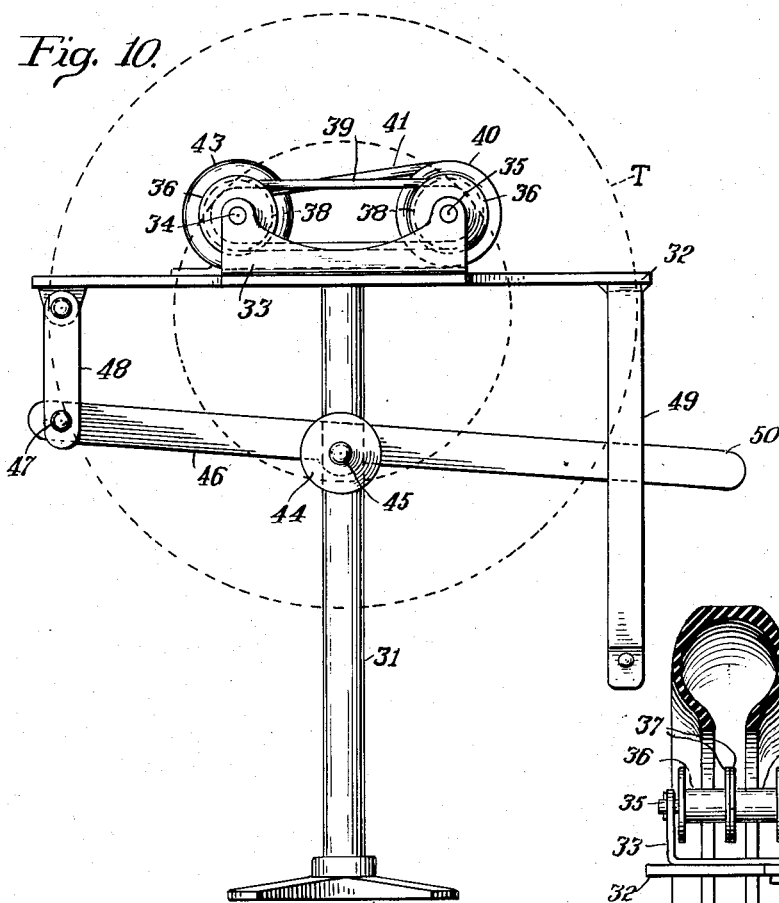
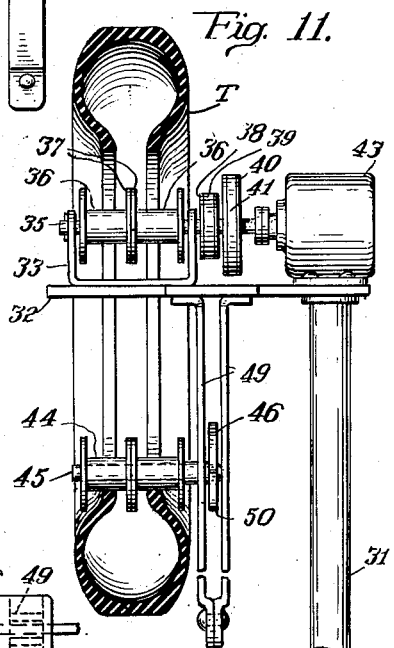
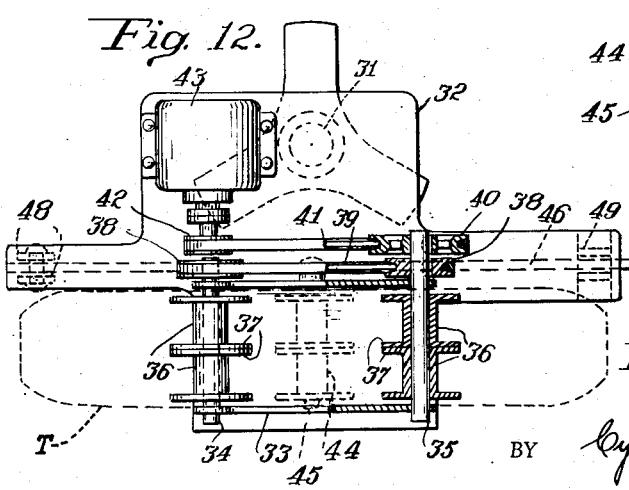
INVENTOR
Elmore M. Godfrey Jr.
ATTORNEYS

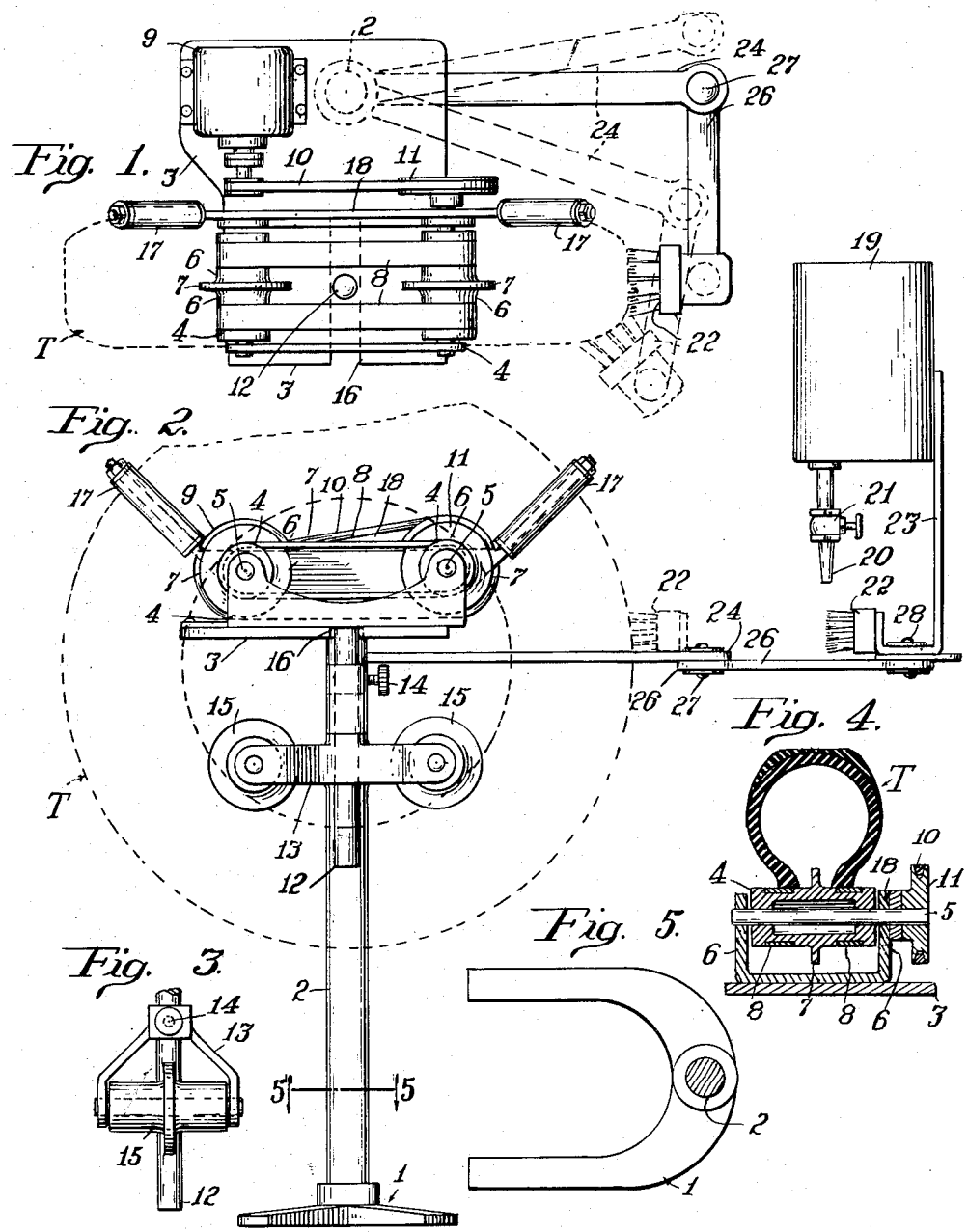

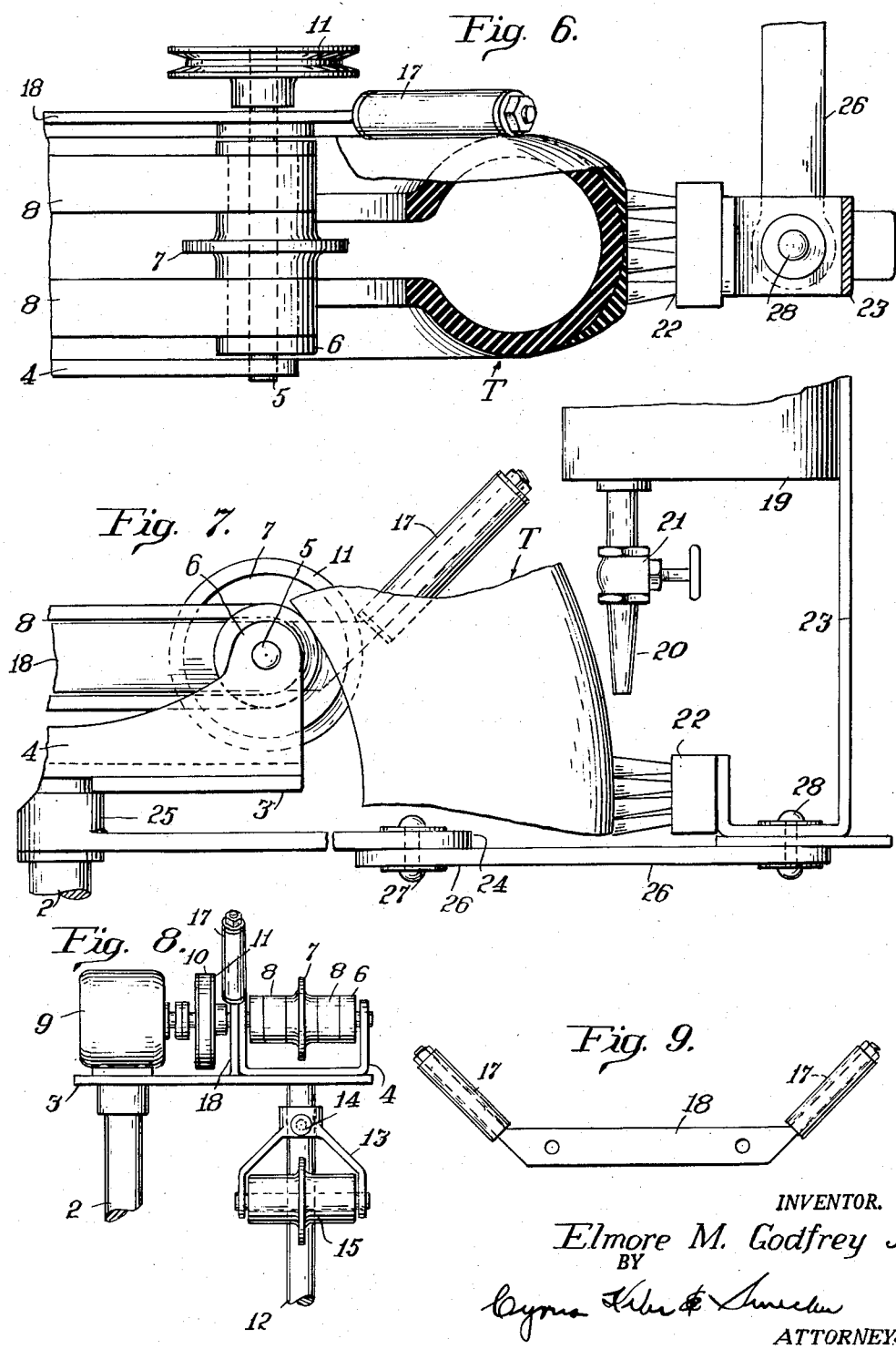

Patented Sept. 28, 1954

2,690,207

UNITED STATES PATENT OFFICE 2,690,207

TIRE TREAD CEMENTING MACHINE

Elmore M. Godfrey, Jr., Knoxville, Tenn.

Application December 3, 1951, Serial No. 259,655

17 Claims. (Cl. 154—9)

This invention relates to improvements in tire tread cementing machines of the character used for preparing tires for retreading.

It is the usual practice at the present time, in preparing a tire for retreading, to remove the old peripheral surface of the tire by a cutting or abrading action to a sufficient depth, after which a rubber strip is cemented around the periphery of the tire in position to be vulcanized thereon so as to form the new tread for the tire. The application of cement to the periphery of the tire is a slow and time consuming, as well as laborious operation when it is performed by hand and, moreover, it results frequently in a non-uniform application of cement, as it is applied by a brush.

One object of this invention is to improve the construction of cementing machines of the character used for applying cement to tires for retreading, to apply the cement uniformly to the periphery of the tire without the necessity for a manual brushing of the cement thereon.

Another object of the invention is to provide for the power rotation of the tire in peripheral contact with the cement brushing means so as to permit of smooth and uniform application of the cement thereto as the tire is revolved, without manual brushing of the cement on the periphery of the tire.

Still another object of the invention is to provide for a support and power driving means for a tire to which a tread is to be applied, which means is relatively simple and inexpensive to manufacture, and yet is effective for the supporting and turning of the tire during an operation on the periphery of the tread thereof.

These objects may be accomplished according to one embodiment of the invention by the provision of a supporting stand on which guide rollers are mounted for holding the tire during an operation on the periphery thereof, such as the application of cement thereto and the tread forming material. Power means preferably is used to drive the rollers, which are mounted on the stand, or to drive the tire supported thereon. The same stand preferably supports the cementing means which latter includes, in this embodiment, a suitable brush together with a source of liquid cement applied directly to the brush for application to the periphery of the tire as the latter is rotated in contact with the brush. The brush may be guided by an operator into contact with different laterally directed portions of the tire, as by swinging from side to side with respect thereto so as to apply the cement smoothly and uniformly to the tire as the latter is revolved in contact with the brush.

This embodiment of the invention is illustrated in the accompanying drawings, in which:

Fig. 1 is a top plan view of the machine;

Fig. 2 is a side elevation thereof;

Fig. 3 is a detail elevation of one of the guide rollers;

Fig. 4 is a cross-section through another of the guide rollers, with a tire mounted thereon;

Fig. 5 is a detail cross-section through the stand on the line 5—5 in Fig. 2;

Fig. 6 is an enlarged plan view of the tire support and brushing means;

Fig. 7 is a side elevation thereof;

Fig. 8 is an end elevation of the machine, with parts broken away and omitted;

Fig. 9 is a detail side elevation of the side rollers for the tire;

Fig. 10 is a side elevation of the machine illustrating a modification therein;

Fig. 11 is a vertical cross-section therethrough; and

Fig. 12 is a top plan view thereof, partly in section.

Referring to Fig. 2 of the drawings, the machine illustrated is shown as supported on a base 1, from which a column 2 extends upwardly as a support for the operating parts of the machine. The shape and character of this supporting structure may be varied as desired, according to the operating conditions for the machine.

Mounted on the upper end of the column 2 is a supporting plate 3, which is secured rigidly to the column and extends laterally therefrom, as will be apparent from Fig. 8. The plate 3 preferably extends laterally to one side of the column 2 and forms a support for the operating parts of the machine.

Seated upon the plate 3 is a saddle 4 which is elongated transversely of the axis of the column 2, as shown in Fig. 2, and preferably is U-shaped in cross-section. Journaled in opposite sides of the saddle 4 are shafts 5 upon which are fixed guide rolls 6, a pair of said rolls 6 being provided in upstanding relation for supporting a tire thereon, as indicated in Fig. 2, in which the tire is shown in dotted lines and designated at T. Each of the rolls 6 has a peripheral guide rib 7 intermediate the length thereof to fit between the sides of the tire, as indicated in Fig. 4, and guide the tire on the rolls. A driving connection between the pair of rolls 6 is formed by belts 8 extending therearound, as shown in Figs. 1, 2 and 6.

The guide rolls 6 are power driven by a suitable motor, generally indicated at 9, preferably an electric motor, which is shown as mounted on the supporting plate 3. The motor 9 is connected by a belt 10 with a pulley 11, fixed on one of the shafts 5, which connection from the motor to the shaft is of a character to reduce appreciably the operating speed of the motor to a speed which will turn the tire T at the desired peripheral speed.

A guide rod is shown at 12, fixed to the saddle 4 and extending downward through the supporting plate 3, to a lower point. A guide frame is shown generally at 13, mounted on the rod 12, for vertical adjustment thereon and either loose on the rod or fixed relative thereto by a set screw 14. The frame 13 carries a pair of guide rolls 15 in the opposite ends thereof, which are constructed substantially the same as the guide rolls 6 described above, although not being power driven in this example of the invention. The guide rolls 15 are adapted to bear against the inner periphery of the tire substantially in diametrically opposed relation from the guide rolls 6, as will be apparent from Fig. 2, and cooperate therewith to hold the tire securely in place, in guiding relation to the adhesive applying means hereafter described.

The guide rod 12 is shown as extending through a slot 16 in the plate 3, to permit of bodily lateral adjustment of the guide means relative to the supporting plate and cementing means so as to accommodate tires of different sizes. Tires of different diameters may be accommodated also by adjustment of the guide rolls 15, lengthwise of the supporting rod 12, and thereby hold the tire effectively in place.

An additional guiding action may be provided by side guide rolls 17, supported upon a bracket 18 secured to one side of the saddle 4. These rolls 17 bear laterally against a side of the tire T as the latter is supported on the guide rolls 6 and 15 and serve as additional means for holding the tire in proper relation to the cementing means.

The cementing device is shown as comprising a reservoir or tank 19, having a depending nozzle 20 connected therewith and controlled by a valve 21 for discharging cement from the tank 19 through the nozzle 20 directly onto a brush 22. The tank 19 is supported on a bracket 23, which is the same bracket on which the brush 22 is mounted in the example illustrated, although any suitable means may be provided for supporting the tank and brush in relation to each other.

This cementing device is adapted for bodily swinging movement with respect to the tire T, as illustrated in different positions in full lines and in dotted lines in Fig. 1. Accordingly I have provided mounting means in the form of a supporting arm 24 journaled at 25 (Fig. 7) on the upper end of the column 2 and extending outwardly therefrom. The outer end of the arm 24 has a link 26 pivoted thereto at 27, for swinging movement with respect to the arm 24. The free end of the link 26 supports in turn the tank 19 and brush 22, having the bracket 23 mounted on the arm 26 by fastening means, as illustrated at 28.

The operation of this cementing machine will be apparent from the foregoing description. The tire is mounted and supported on the guide rolls 6 and 15, and if the additional guide means 17 is provided, the tire should bear laterally against the latter. The drive motor 9 operates the guide rolls 6 to turn the tire by power in a revolving action on the guide means thus provided.

The operator controls the application of cement from the tank 19 onto the brush 22 by the valve 21. The valve may be open just sufficiently to allow the cement to drop on the brush in sufficient quantity so as to apply a uniform coating on the periphery of the tire as the latter revolves in contact with the brush. Since it is usually necessary to apply cement over a considerable portion of the tread surface of the tire, of which the latter is convex, it is desirable that the brush be capable of movement transversely with respect to the tread surface, as indicated in the different positions shown in Fig. 1. This is made possible by the manual swinging of the brush to the desired positions, by the action of the links 24 and 26 which enable the operator to apply the cement to the required portion of the tire quickly and uniformly, and without a laborious brushing action manually, as was required heretofore. Moreover, this machine may utilize an inexpensive brush as sufficient to apply the cement to the tire without requiring the expensive fine brush usually thought necessary when applying the cement by hand, and it accomplishes a more effective application of the cement much more quickly than was possible when applied manually, as well as obtaining a more uniform application thereof.

In the modification shown in Figs. 10 to 12 the stand generally designated at 31 is shown as composed of a base and column corresponding with those described above, although any other suitable supporting stand may be used, as desired. A supporting plate 32 is mounted on the stand 31, and this in turn supports a saddle 33 corresponding with the saddle 4, described above.

Journaled in the saddle 33 are shafts 34 and 35 that extend transversely of the saddle. Rollers 36 are fixed rigidly to the respective shafts 34 and 35, the rollers 36 being arranged in a pair on each shaft in abutting relation with each other, and having abutting flanges 37 adapted to engage between the sides of a tire T, as shown in Fig. 11, as a guide thereon.

The shafts 34 and 35 are provided with sheaves or pulleys 38 connected together by a belt 39 forming a driving action therebetween.

The shaft 35 is provided also with a driving pulley 40 connected by a belt 41, with a pulley 42 mounted on the armature shaft of a driving motor 43, which is shown as supported on the plate 32.

It will be apparent that the operation of the motor 43 will transmit movement to the shaft 35, rotating the latter, and in turn the shaft 34 through the driving belt 39. This will impart movement to the rollers 36 and thus turn the tire which is supported on these rollers in the manner described above.

A single roller is shown at 44 in the upright transverse central plane of the tire for guiding the latter. The roller 44 may be constructed like one of the rollers 15, or as a pair of the rollers 36 coacting to form a single rolling action.

The roller 44 is journaled on a pin 45 mounted on a lever 46, which extends transversely beside the tire T, as shown in Fig. 11. One end of the lever 46 is pivoted at 47 to a depending swinging link 48, supported by the plate 32, while the opposite end of the lever 46 extends laterally through a guide 49 suspended from the plate 32, and has as a handle portion 50 for manipulating the lever. It will be obvious that the handle portion 50 may be grasped by the operator to raise the roller 44 out of engagement with the inner surface of the tire, thus allowing the latter to be lifted off the stand. However, when the lever 46 is released, it will cause the roller 44 to be lowered by gravity into guiding relation with the inner diameter of the tire at the bottom.

While the invention has been illustrated and described in certain embodiments, it is recognized that other variations and changes may be made therein without departing from the invention as set forth in the claims.

I claim:

1. In a tire cementing machine, the combination of a support, a saddle mounted on said support, a pair of guide rolls journaled on the saddle on transversely spaced axes, means forming a driving connection between the rolls for uniform rotation thereof, and power means mounted on the support for rotating the rolls to turn the tire on the support.

2. In a tire cementing machine, the combination of a support, a saddle mounted on the support, a pair of guide rolls journaled on the saddle and adapted to be surrounded by a tire mounted thereon, a belt extending from one guide roll to the other and operatively connecting the rolls together for uniform rotation, a power motor mounted on the support, and means forming a driving connection from the motor to the rolls for operating the rolls to turn the tire.

3. In a tire machine, the combination of a support, a pair of guide rolls mounted on spaced axes adapted to support a tire thereon for turning movement, gearing means interconnecting the rolls for uniform driving relation with the tire supported thereon, and power means having operative connection with the gearing means for driving said rolls.

4. In a tire cementing machine, the combination of a support, means mounted on the support adapted to be surrounded by a tire mounted thereon for supporting the tire for turning movement, and guide rolls upstanding from said supporting means and laterally displaced therefrom in position to operate in guiding relation with the side of the tire mounted on the supporting means tending to hold the tire in proper alignment thereon.

5. In a tire cementing machine, a combination with cement applying means adapted to apply cement directly to the periphery of a tire, of supporting means for the tire including guide rolls adapted to be surrounded by the tire mounted thereon, power means driving said rolls for turning the tire in operative relation to the cement applying means, and kinematic means connecting said cement applying means with said supporting means.

6. In a tire cementing machine, the combination with a cement applying brush and means for applying cement to the brush, of tire supporting means including guide rolls adapted to receive and mount a tire thereon, and power means operatively connected with the rolls for operating the latter to turn the tire while in engagement with the cement applying brush.

7. In a tire cementing machine, the combination with tire supporting means adapted to receive and mount a tire thereon, of a cement applying brush, means mounting the brush for movement bodily relative to the tire on the supporting means, a container for cement mounted on the brush mounting means, said container being in position to supply cement by gravity onto the brush.

8. In a tire cementing machine, the combination with tire supporting means adapted to receive and mount a tire thereon, of a cement applying brush, means mounting the brush for movement bodily relative to the tire on the supporting means, a container for cement mounted on the brush mounting means, said container having a depending nozzle over the brush in position to supply cement thereto by gravity.

9. In a tire cementing machine, the combination with tire supporting means adapted to receive and mount a tire thereon, of a cement applying brush, means mounting the brush for movement bodily relative to the tire on the supporting means, a container for cement mounted on the brush mounting means, said container having a depending nozzle over the brush in position to supply cement thereto by gravity, and a valve connected with the nozzle for controlling the discharge therefrom onto the brush.

10. In a tire cementing machine, the combination with a cement applying brush and means for applying cement to the brush, of tire supporting means including guide rolls adapted to receive and mount a tire thereon, power means operatively connected with the rolls for operating the latter to turn the tire while in engagement with the cement applying brush, and supporting means for the brush for bodily movement of the brush transversely of the tire and toward and away from the periphery thereof when the tire is mounted on the supporting means.

11. In a tire cementing machine, the combination with tire mounting means for supporting a tire thereon, of cement applying means including a brush mounted on said support and adapted to operate against the periphery of the tire, means in position to supply cement to the brush, and means for controlling the supply of cement thereto.

12. In a tire cementing machine, the combination with tire mounting means for supporting a tire thereon, of cement applying means including a brush adapted to operate against the periphery of the tire, means in position to supply cement to the brush, means for controlling the supply of cement thereto, and means mounting the brush for bodily movement toward and from the periphery of the tire and for turning movement to different lateral positions transversely of the tire on the mounting means.

13. In a tire cementing machine, the combination with an upright standard, means mounted on the standard for journaling a tire for turning movement, cement applying means including a brush adapted to operate against the periphery of the tire, means arranged for supplying cement to the brush, an arm journaled on the column and extending outwardly therefrom, a link carried by the arm and pivoted thereto for swinging movement relative thereto, and means mounting the brush on the link for bodily movement toward and from the periphery of the tire and transversely relative thereto while the tire is supported on the mounting means.

14. In a tire cementing machine, the combination with a support, tire mounting means for supporting a tire thereon, of a cement applying brush, and an articulated arm pivotally mounted at one end on the support and pivotally supporting the brush on the opposite end thereof.

15. In a tire cementing machine, the combination with a support, tire mounting means for supporting a tire thereon, of a cement applying brush, and an articulated arm pivotally mounted at one end on the support and supporting the brush on the opposite end thereof, said arm extending transversely of the tire for bodily movement of the brush laterally of the tire on the mounting means.

16. In a tire cementing machine, the combination with a support, tire mounting means for supporting a tire thereon, of a cement applying brush, an articulated arm pivotally mounted at one end on the support and supporting the brush on the opposite end thereof, said arm extending transversely of the tire for bodily movement of the brush laterally of the tire on the mounting means, and a cement container mounted on the arm and having a nozzle in position to supply cement to the brush.

17. In a tire cementing machine, the combination with a support, tire mounting means for supporting a tire thereon, of a cement applying brush, an articulated arm pivotally mounted at one end on the support and pivotally supporting the brush on the opposite end thereof, a cement container on the machine, and means for directing cement from said container to the brush to be applied thereby to the tire.

References Cited in the file of this patent

UNITED STATES PATENTS

| Number | Name | Date |
|---|---|---|
| 2,032,244 | Wood | Feb. 26, 1936 |
| 2,373,638 | Perkins | Apr. 10, 1945 |
| 2,405,802 | Taber | Aug. 13, 1946 |
| 2,498,953 | Glynn | Feb. 28, 1950 |
| 2,556,264 | Flynn | June 12, 1951 |